United States Patent

(12) United States Patent
Soler et al.

(10) Patent No.: US 9,340,646 B2
(45) Date of Patent: May 17, 2016

(54) PROCESS FOR PURIFYING POLY(ALKYLENE CARBONATE)

(75) Inventors: Carlos Barreto Soler, Porsgrunn (NO);
Siw Bodil Fredriksen, Skien (NO);
Espen Ommundsen, Langesund (NO)

(73) Assignee: NORNER IP AS, Stathelle (NO)

( * ) Notice: Subject to any disclaimer, the term of this patent is extended or adjusted under 35 U.S.C. 154(b) by 0 days.

(21) Appl. No.: 14/232,250

(22) PCT Filed: Jul. 11, 2012

(86) PCT No.: PCT/EP2012/063611
§ 371 (c)(1),
(2), (4) Date: Feb. 12, 2014

(87) PCT Pub. No.: WO2013/007759
PCT Pub. Date: Jan. 17, 2013

(65) Prior Publication Data
US 2014/0155573 A1    Jun. 5, 2014

(30) Foreign Application Priority Data

Jul. 12, 2011 (GB) .................................. 1111928.6

(51) Int. Cl.
C08G 64/40 (2006.01)
C08G 64/02 (2006.01)
C08J 5/18 (2006.01)
C08G 64/34 (2006.01)
C08G 64/00 (2006.01)

(52) U.S. Cl.
CPC .......... *C08G 64/406* (2013.01); *C08G 64/0208* (2013.01); *C08G 64/34* (2013.01); *C08J 5/18* (2013.01); *C08J 2369/00* (2013.01)

(58) Field of Classification Search
CPC ....................................................... C08G 64/40
USPC .......................... 528/405, 412, 413, 414, 503
See application file for complete search history.

(56) References Cited

U.S. PATENT DOCUMENTS

| 3,668,181 | A | 6/1972 | Oxenrider |
| 4,066,630 | A | 1/1978 | Dixon et al. |
| 4,316,009 | A | 2/1982 | Rinaldi et al. |
| 4,921,940 | A | 5/1990 | Odell et al. |

(Continued)

FOREIGN PATENT DOCUMENTS

| EP | 504410 A1 | 9/1992 |
| JP | 61250026 A | 4/1985 |
| JP | 63218730 A | 3/1987 |

(Continued)

OTHER PUBLICATIONS

Zhang et al., Partial delamination of the organo-montmorillonite with surfactant containing hydroxyl groups in maleated poly(propylene carbonate), Polymer 47: p. 8548-8555, 2006.

(Continued)

*Primary Examiner* — Duc Truong
(74) *Attorney, Agent, or Firm* — Meunier Carlin & Curfman LLC

(57) ABSTRACT

A process for purifying a poly(alkylene carbonate), said process comprising the steps of adding said poly(alkylene carbonate) to an aqueous solution, optionally in the presence of an acid compound, in the absence of any organic solvent. subsequently heating said blend to a temperature of up to 200° C.; and removing the aqueous phase and drying the residue.

19 Claims, 4 Drawing Sheets

(56) References Cited

U.S. PATENT DOCUMENTS

Figure 1:
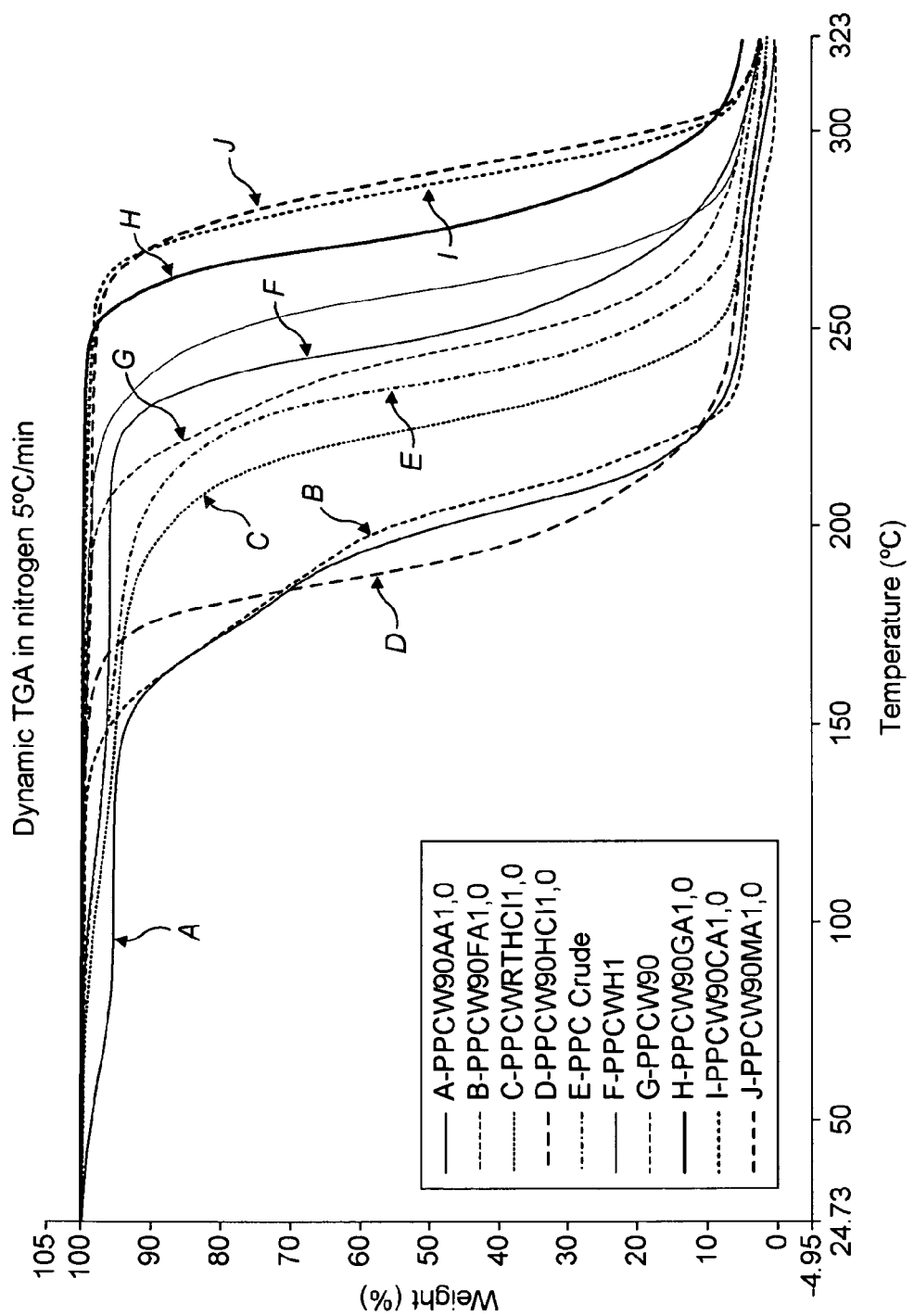

| | | |
|---|---|---|
| 5,041,469 A | 8/1991 | Hostetler et al. |
| 6,100,372 A | 8/2000 | Kim et al. |

FOREIGN PATENT DOCUMENTS

| | | |
|---|---|---|
| JP | 4142330 A | 10/2003 |
| WO | 03020483 A1 | 3/2003 |
| WO | 03050162 A1 | 6/2003 |
| WO | 2010033703 A1 | 3/2010 |

OTHER PUBLICATIONS

Gao et al., Thermally Stable Poly(propylene carbonate) Synthesized by Copolymerizing with Bulky Naphthalene Containing Monomer, J Appl Polymer Sci 108: p. 1037-1043, Jan. 22, 2008.

Dixon et al., Thermal Stabilization of Poly(Alkylene Carbonate)s, J Polymer Sci, Polymer Lett Ed 18: p. 131-134, 1980.

Li et al., Study on the influence of metal residue on thermal degradation of poly(cyclohexene carbonate), J. Polymer Res, Oct. 23, 2010.

Li et al., Melt Processable and Biodegradable Aliphatic Polycarbonate Derived from Carbon Dioxide and Propylene Oxide, J Appl Polymer Sci 89: p. 3301-3308, 2003.

Liu et al., Degradation and Stabilization of Poly(propylene carbonate), Macromol Rapid Commun 23: No. 15 p. 881-884, 2002.

Spencer et al., Decomposition of poly(propylene carbonate) with UV sensitive iodonium salts, Polymer Degradation and Stability 96: p. 686-702, 2011.

Peng et al., Thermal degradation kinetics of uncapped and end capped poly(propylene carbonate), Polymer Degradation and Stability 80:p. 141-147, 2003.

Yao et al., Improved Thermal Stability and Mechanical Properties of Poly(propylene carbonate) by Reactive Blending of Maleic Anhydride, J Appl Polymer Sci 120: p. 3565-3573, 2011.

Yu et al., Improving the Processability of Biodegradable Polymer by Stearate Additive, J Appl Polymer Sci 120: p. 692-700, 2011.

Yu et al., Improving thermal stability of biodegradable aliphatic polycarbonate by metal ion coordination, Polymer Degradation and Stability 94:p. 253-258, 2009.

Barreto et al., Novel solventless purification of poly (propylene carbonate) : Tailoring the composition and thermal properties of PPC, Polymer Degradation and Stability, 97:p. 893-904, 2012.

International Search Report and Written Opinion for PCT/EP2012/063611, dated Sep. 25, 2012.

PROCESS FOR PURIFYING POLY(ALKYLENE CARBONATE)

FIELD OF THE INVENTION

The present invention relates to processes for the manufacture and isolation of polycarbonates, in particular poly(alkylene carbonates) (PAC). In particular, the invention relates to the use of a specific purification procedure. The invention also relates to the poly(alkylene carbonates) produced by such processes and to articles made therefrom.

BACKGROUND

Until recently, poly(alkylene carbonates) have had limited commercial application. They have been used as sacrifice polymers in the electronics industry but in few other applications. Other applications of these polymers have been limited, among others, by their relative thermal instability.

The present inventors have realised that these poly(alkylene carbonates) offer environmentally friendly potential. The use of carbon dioxide in the formation of poly(alkylene carbonates) provides a useful sink for carbon dioxide and therefore these polymers offer an environmentally friendly alternative to fossil fuel based materials such as a polyolefin. There are therefore significant benefits to using PACs industrially.

As noted above, commercial applications of poly(alkylene carbonates) are limited by their low thermal stability. Furthermore, thermal decomposition of these polymers occurs at rather low temperatures, e.g. at 180° C. for poly(propylene carbonate) (PPC). These properties severely limit the processability of PACs on a commercial scale. Methods of broadening the properties and processing window so as to enhance the applicability of PACs are therefore sought. Crosslinking the PAC is one route which has been investigated and, to date, some progress has been achieved.

There remains, however, a need for new methods to produce significant quantities of PAC's, which possess advantageous properties such as improved thermal stability. In particular, the inventors sought new processes which produce PAC's with higher glass transition temperatures and/or enhanced higher temperature thermal stability over those known in the art are needed.

The present inventors have surprisingly established that careful control of polymer purification procedures can give rise to polymers with improved thermal properties. The resulting materials exhibit beneficial properties, in particular in terms of rigidity and thermal stability.

Moreover, the inventors have found that purification can be successfully effected in the absence of organic solvents. In typical purification procedures for aliphatic polycarbonates, the use of organic solvents is normal. The polymer formed contains catalyst residues and in order to remove these, organic solvents are routinely used, in particular chlorinated solvents such as chloroform and dichloromethane. These solvents are potentially toxic but are definitively expensive. Moreover, the quantities of solvent employed can be vast. Even if the solvent is recycled, there are still expensive separation and purification procedures needed to reuse solvent.

Organic solvents are also believed essential to remove certain impurities from the formed polycarbonate. For example, the polymerisation of propylene oxide and carbon dioxide forms polypropylene carbonate and may also form propylene carbonate. This compound is believed to cause melt fracture, act as a plasticizer and make the resin tacky. To remove this impurity, the use of dichloromethane and methanol or other solvents and antisolvents is conventional. Typically, the process involves a liquid-liquid extraction. After dissolution in the solvent, the polycarbonate material is washed with an aqueous acid and subsequently a non solvent such as methanol is added to precipitate the polycarbonate.

These organic solvents also dissolve oligomeric portions of the polycarbonate however. They also remove portions of the PAC in which there is a high ether linkage content. Whilst removing some of these oligomeric compounds might be regarded as advantageous in order to reduce migration, the amounts lost in organic solvent may be significant. Valuable PAC is simply being removed with the organic solvent.

Peng, Polymer degradation and stability 80 (2003) 141-147, suggests end capping as a means for improving polymer stability by decreasing the chain unzipping from the hydroxyl end groups in the PAC at low temperatures Peng achieves end capping in organic solvent. In a similar disclosure Yao et al, J Appl Polm Sci vol 120, 3565-3573 (2011) achieves that result by melt blending with maleic anhydride. Further more, thermal stability can be further improved by the addition of calcium stearates and stearic acid according to Yu et al in J Appl Polm Sci vol 120, 690-700 (2011).

There are therefore various methods available to improve thermal stability. However, the amount of acid applied, in particular to cause end capping, is high. Resins from the prior art with reported enhancement of thermal stability, suffer from the presence of acid residues that may represent a problem for further processing (corrosion of machinery) and application (migration of acid residues).

In the present invention, the amount of acid residues present will be lower since the products have been subjected to a thorough washing as part of the treatment. Additionally, the processes used in the prior art may be insufficient in the removal of unwanted side products and may likewise leave undesirable high solvent residues in the polymer. Also, the prior art precipitation method from solvent mixtures may not give polymer particles suitable for further handling as agglomeration is an issue.

SUMMARY OF THE INVENTION

Thus, viewed from a first aspect the invention a process for purifying a poly(alkylene carbonate), said process comprising the steps of
(i) adding said poly(alkylene carbonate) to water in the absence of any organic solvent to form a solid:liquid blend, said poly(alkylene carbonate) having a particle size less than 20 mm, preferably less than 5 mm;
(ii) heating said blend to a temperature of up to 200° C.; and
(iii) removing the aqueous layer and optionally drying the residue.

Viewed from another aspect the invention provides a process for purifying a poly(alkylene carbonate), said process comprising the steps of
(i) adding said poly(alkylene carbonate) to an aqueous acidic solution in the absence of any organic solvent;
(ii) heating said blend to a temperature of up to 200° C.; and
(iii) removing the aqueous layer and optionally drying the residue.

Viewed from another aspect, the invention provides a poly(alkylene carbonate) obtained by a process as hereinbefore defined.

The poly(alkylene carbonate) used in the process is preferably a crude poly(alkylene carbonate) obtained directly from the polymerisation reaction via solvent removal. The invention may however be carried out on PACs which have already been purified by other methods.

Viewed from another aspect therefore the invention provides a process comprising (a) reacting carbon dioxide with a cyclic ether in the presence of a catalyst (e.g. Zn catalyst) and an organic solvent so as to form a poly(alkylene carbonate);

(b) removing said organic solvent to leave a crude poly(alkylene carbonate);

(c) if necessary converting said poly(alkylene carbonate) into particles of less than 20 mm in diameter, preferably less than 5 mm in diameter;

(d) adding said crude poly(alkylene carbonate) to water in the absence of any organic solvent to form a solid:liquid blend;

(e) heating said blend to a temperature of up to 200° C.; and (f) removing the aqueous layer and optionally drying the residue.

Viewed from another aspect therefore the invention provides a process comprising (a) reacting carbon dioxide with a cyclic ether in the presence of a catalyst (e.g. Zn catalyst) so as to form a poly(alkylene carbonate);

(b) if necessary converting said poly(alkylene carbonate) into particles of less than 20 mm, preferably less than 5 mm in diameter;

(c) adding said crude poly(alkylene carbonate) to water in the absence of any organic solvent to form a solid:liquid blend;

(d) heating said blend to a temperature of up to 200° C.; and (e) removing the aqueous phase and optionally drying the residue.

DETAILED DESCRIPTION OF THE INVENTION

The present invention provides manageable particles of poly(alkylene carbonate) with enhanced thermal properties. This is achieved using a purification procedure employing a solid-liquid extraction procedure. Most prior art purification procedures rely on liquid-liquid extraction.

The treatment in water allows the extraction of water soluble compounds like polyether containing chains, cyclic carbonates, residues of catalyst, monomers and solvents present in the resin. The treatment also deactivates the catalyst residues. This is a novel approach compared to the prior art that requires the use of organic solvents and acids to remove by-products and catalyst residues.

The selection of the type of acid, its concentration together with the selection of the treatment temperature, contact time and stirring efficiency are variables allowing the control of the final properties of the treated resins. In the case of acetic acid and formic acid (among others), at certain concentrations, the treatment enhances the PAC degradation. These treated materials tend therefore to decompose more readily than water treated analogues. In the case of maleic acid, citric acid and glutaric acid (among others), the thermal stability is enhanced to unprecedented levels at the onset of the thermal decomposition.

Poly(Alkylene Carbonate)

The term poly(alkylene carbonate) is used to indicate that the polycarbonates of this invention are free of aromatic groups in the main backbone of the polymer. They can however, contain cyclic, non aromatic groups in the backbone. These cyclic groups can be saturated or unsaturated. The poly(alkylene carbonates) of the invention are not therefore based on bisphenol-A type products. The PAC's are otherwise broadly defined.

The backbone of the PACs of the invention contains O—C(=O)—O linkages along with a non aromatic linker between those linkages such as an alkylene chain.

The backbone of the polymer can, however, carry a wide variety of substituents (side chains) including aromatic side groups.

The PAC is preferably one formed from the polymerisation of carbon dioxide with a cyclic ether or perhaps from the ring opening of a cyclic carbonate. The term cyclic ether is used here to cover not only epoxides (3-membered cyclic ethers) but also larger cyclic ethers such as those based on 4-6 membered rings or more. Preferably, the cyclic ether is an alkylene based epoxide.

For example, the reaction of the four membered ring ether oxirane with carbon dioxide gives polytrimethylene carbonate (Darensbourg, D. J. Inorg. Chem. 2010, 49, 10765-10780).

Suitable (non epoxide) cyclic ether monomers are therefore of formula (II)

(II)

where a is 0-2 and $R_5$ is the same as $R_1$ below. The number of $R_5$ groups which may be present may be the same as the number of carbon atoms in the ring of the cyclic ether (e.g. up to 5). Preferably however, only 1 such group is present, if at all.

Alternatively, PACs can be formed during the ring opening of a cyclic carbonate with a variety of catalysts as described in e. g. Suriano *Polym. Chem.*, 2011, 2, 528-533; Endo et al. Journal of Polymer Science Part A: Polymer Chemistry 2002, 40(13), 2190-2198.

As long as the backbone of the PAC does not contain an aromatic group within the backbone then any method can be used to form the PACs of the invention.

It is most preferred however, if the PACs are obtained through the polymerisation of a cyclic ether with carbon dioxide and especially through the polymerisation of carbon dioxide and an epoxide. Preferably, the epoxide of use in the invention is of formula (I)

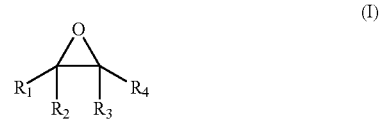

(I)

wherein $R_1$ to $R_4$ are each independently hydrogen; $C_{1-10}$ alkyl optionally interrupted by one or more heteroatoms selected from O or N; $C_{2-10}$-alkenyl optionally interrupted by one or more heteroatoms selected from O and N; C6-10-aryl; or $R_2$ and $R_3$ taken together can form a non aromatic, cyclic group having 4 to 8 atoms in the ring, said ring optionally comprising one or more heteroatoms selected from O or N;

said non aromatic cyclic group or any of $R_1$ to $R_4$ being optionally substituted by one or more $C_{1-6}$ alkyl groups, $C_{2-10}$-alkenyl groups, C6-10-aryl groups, $OC_{1-6}$ alkyl groups or OH.

It is preferred if at least one, preferably at least two of $R_1$ to $R_4$ are hydrogen. Ideally, the carbon atoms attached to the epoxide should also be bonded directly to a hydrogen atom. In a highly preferred embodiment, three of $R_1$ to $R_4$ are hydrogen or all 4 are hydrogen (thus forming ethylene oxide).

When not hydrogen, it is preferred if substituents $R_1$ to $R_4$ are $C_{1-6}$-alkyl or $C_{2-6}$-alkenyl groups. If an alkenyl group is present, the double bond should not conjugate the epoxide. Any alkenyl group should preferably contain at least 3 carbon atoms and the double bond should be at least beta to the epoxide carbon.

If $R_2$ and $R_3$ are taken together, they preferably form a 5 or 6 membered ring with the carbon atoms to which they are attached, especially a carbocyclic ring. That ring can be saturated or monounsaturated, preferably saturated.

In formula (I), it is preferred if no heteroatoms other than the O of the epoxide are present. It is also preferred if compounds of formula (I) are free of alkenyl groups.

A preferred monomer is therefore of formula (II)

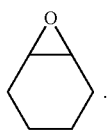

(II)

where $R_{2'}$ and $R_{3'}$ are independently hydrogen, C1-6 alkyl, phenyl or $R_{2'}$ and $R_{3'}$ taken together form a 5 or 6 saturated or monounsaturated carbocyclic ring. Preferred epoxide monomers include limonene oxide, styrene oxide, propylene oxide, ethylene oxide or cyclohexene oxide, i.e. the compound

It will be appreciated that the polymerisation reaction takes place in the presence of carbon dioxide so there is typically an excess of carbon dioxide in the polymerisation reaction.

In an ideal scenario, the PAC of the invention is one such as

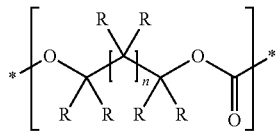

where n is 0 to 4 and R is a side chain such as defined above for $R_1$ to $R_4$.

In particular the PAC of the invention may be:

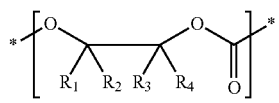

It will be appreciated, however, that when the epoxide and the carbon dioxide are polymerised, the structure of the polymer which forms may not be a perfectly alternating ABABA type polymer as depicted here. The invention encompasses the polymer which forms when these two monomers are polymerised. The polymer regioregularity may be described by the "head to tail" ratio as used in the conventional sense for polyalkylene carbonates and determined as described e. g. in Lednor et al. J. Chem. Soc. Chem. Commun. 1985, 598-599.

Further, the polymer chains may also include blocks of e.g. epoxide monomer residues as is well known. It is very common for ether linkages to be present in PACs. It is preferred if the content of polymer chains containing ether linkages is less than 15 wt %, preferably less than 10 wt %. The ether content can be determined by $^1H$ NMR e. g. as described in Luinstra, G. Polymer Reviews, 48:192-219, 2008.

It is of course possible for a mixture of cyclic ether monomers to be used in the invention.

It is also possible for other monomers to be present in the PACs of the invention. For example, a difunctional or polyfunctional epoxide can be present during the polymerisation reaction in addition to the monomers described above. Typically this will be added in small amounts, e.g. less than 1 wt % of the reaction mixture as a whole, preferably less than 0.1 wt % of the reaction mixture.

Multifunctional epoxides of interest include vinylcyclohexene dioxide or epoxides carrying an epoxide ($CH_2CH_2O$) side chain. The latter monomers introduce an epoxide group into side chain of the PAC. This may allow further increases in Mw and allow the Mw/Mn to be broadened during a crosslinking reaction involving the pendant group carrying an alkenyl group or an epoxide group.

It is also within the scope of the invention for other monomers to be used in the manufacture of the PAC. For example, the use of lactone monomers is envisaged. Lactone monomers of interest include β-propiolactone, γ-butyrolactone, δ-valerolactone, ε-caprolactone. The use of lactones typically results in the formation of block polymers.

Other alternative monomers include anhydrides such as maleic anhydride which contains an alkenyl group. Some monomers can therefore provide cross-linkable units into the backbone or the side chains of the polymer. In addition the side chains of the PAC can contain groups such as alkenyl groups which can be crosslinked.

As noted above, PACs can have varying degrees of regularity, in particular depending on the nature of the catalyst used to manufacture the polymer. In some embodiments of the invention the PACs may be highly regioregular. Where an epoxide monomer is not symmetrical, it is possible for the addition of each monomer to proceed in differing fashion as is well known in the field. The invention covers all different regioregularities, especially a high head to tail ratio.

Other PACs of interest are formed in the presence of chain transfer agents. When chain transfer agents are present in the polymerization or added during a termination step; or when coupling agents are added as terminating agents or in a post reactor stage, these substances can give raise to special polymer architectures.

Chain transfer agents of interest include di or poly functional molecules like HO—R—OH (diol), HS—R—SH (dithiol), $H_2N$—R—$NH_2$ (diamine). The structures can have two or more branches depending on the functionality of the chain transfer/coupling/terminating agent. The PAC may have the form PAC-O—R—O-PAC, PAC-O—R—O—H, PAC-S—R—S-PAC, PAC-S—R—S—OH, PAC-HN—R—NH-PAC or HN—R—NH-PAC.

The PAC can be end capped or not end capped.

The polymerisation can be catalysed by known catalysts, especially Zn based catalysts or Co based catalysts such as cobalt salen catalysts. Several catalyst systems are known that catalyze the copolymerisation reaction of epoxides and $CO_2$.

The polymerisation can be catalysed by known catalysts, especially Zn based catalysts or Co based catalysts. The use of Zn catalysts are preferred. The use of heterogeneous Zn catalysts is preferred, such as catalyst based on zinc glutarate, e. g. as described in U.S. Pat. No. 4,789,727 and in Ree et al. *J. Pol. Sci. Part A.: Polymer Chemistry* Vol. 37, 1873-1876 (1999) or other Zn based catalysts e. g. as described in WO2009/130470. Cobalt based catalysts are typically cobalt salen catalysts as described in WO2010/028362 and in Cyriac et al. Macromol. 2010, 7398-7801. Catalysts may need a cocatalyst as is well known in the art.

The procedures required to polymerise the monomers to form PACs are well known and are described in the literature. PACs are also commercially available products.

The PACs of the invention can be amorphous or semicrystalline. Typically they are amorphous. Preferably they will have a glass transition temperature (Tg) of at least 0° C., such as at least 20° C., e.g. at least 30° C. It will be appreciated that the Tg will depend heavily on the nature of the PAC in question.

The number average molecular weight Mn of the PAC may be at least 1500 g/mol, preferably at least 2000 g/mol. The use of higher Mn PACs is preferred in this invention. Values of at least 10,000, preferably at least 20,000 are therefore preferred. Mn values of higher than 50,000, preferably at least 75,000 g/mol are also favoured. Mn can be measured by GPC.

The Mw/Mn of the PAC is preferably at least 1, such as at least 2, preferably at least 3.

It will be appreciated that the formation of the PAC may give rise to a well known carbonate impurity. For example, during the formation of polypropylene carbonate, propylene carbonate is formed as a by-product. That is the compound

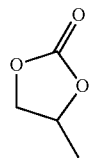

It is common to try to remove this by-product but the present inventors have realised that it acts as a plasticiser and can offer some beneficial properties, in particular in terms of mechanical properties. It may therefore be necessary to reduce the content of this impurity but not necessarily remove it completely. Preferably, the amount of carbonate impurity in the PAC of the invention (i.e. relative to the weight of the PAC) is less than 10 wt %, preferably less than 7 wt %, e.g. 6 wt % or less. In some embodiments, its content can be reduced to less than 2 wt %, especially less than 1 wt %. In many polymers the amounts of carbonate impurity are too low to be detected. It is an option however, if there is at least 1 wt % of the carbonate impurity in the PAC, e.g. at least 2 wt %. The carbonate impurity is preferably propylene carbonate but obviously the nature of the impurity depends on the nature of the PAC being formed.

Other volatiles like epoxides, and solvents used in the polymerization of previous purification stages may be present in low concentration.

PACs suitable for use in the invention can be purchased commercially, e.g. under the trade name QPAC.

Purification Procedure

This invention primarily relates to a novel purification approach which does not make use of organic solvents and gives manageable agglomerate particles of PACs with enhanced thermal properties. It is a solid-liquid procedure whereas prior processes rely on a liquid-liquid extraction followed by a precipitation.

The process of the invention may begin with a conventional synthesis of the PAC. This process takes place in organic solvent such as toluene or DCM. Once the polymerisation process is complete, the solvent used must be removed before the purification of this process begins. Solvent removal can be effected by known methods.

The treatment in water allows the extraction of water soluble compounds like polyether containing chains, cyclic carbonate and other residues of catalyst and solvents present in the resin. The treatment under certain conditions may also deactivate the catalyst residues.

The selection of the type of acid, its concentration together with the selection of the treatment temperature, contact time and stirring efficiency are variables allowing the control of the final properties of the treated resins. For example, treatment with acetic acid and formic acid (among others) at certain acid concentrations may enhance the degradability of PACs. In the case of maleic acid, citric acid and glutaric acid (among others), the thermal stability is enhanced to unprecedented levels at the onset of the thermal decomposition.

The starting material for the process of the invention is preferably a crude poly(alkylene carbonate). It is also possible to use a PAC which has already been purified of course. It is important however that the process occurs in the absence of organic solvent. It will be appreciated that despite solvent removal techniques residual solvent amounts might still be present (perhaps less than 1 wt %). Such a material is still regarded as solvent free here. One way of avoiding the presence of organic solvents may be to carry out the polymerisation to form the PAC in bulk.

The polymerisation process for PAC formation can be stopped by removing monomer feed. The crude product of use in the process of the invention should also be substantially free of organic solvent. Ideally, there should be no purification of the PAC at all other than solvent removal. It is highly preferred therefore if the crude PAC still contains catalyst residues, for example.

Once any polymerisation solvents have been removed, what is left is a solid material which contains the poly(alkylene carbonate) as well as catalyst residues, epoxide residues (~1%) and carbonate impurities. The Tg of this material will often be depressed by the presence of impurities such as cyclic alkylene carbonate, and polyether oligomers.

It will typically be desirable to form this material into a particle size (diameter) of less than 20 mm, preferably less than 5 mm, such as less than 1 mm, preferably 100 to 1000 microns before addition of water or the aqueous acid. The PAC obtained at the end of the polymerisation is typically amorphous and lumpy. This may conveniently be achieved by grinding. The grinding step ensures more uniform particle size and improved surface area to volume ratio.

The grinding step is preferably kept cool to prevent the temperature rising above the glass transition temperature of the poly(alkylene carbonate) in question to avoid agglomeration. The use of cryomilling techniques is particularly favoured here. The use of liquid nitrogen is preferred as the cryo material.

In the broadest aspect of the invention, water can be added at this stage. Ideally therefore, water is added to the milled particles of less than 5 mm in diameter. This addition is preferably effected slowly and continuously or in a step wise fashion. Again, control of temperature is preferred at this stage to prevent agglomeration and degradation. It should be noted that the PAC does not dissolve in water. It may be that the PAC contains some very low Mw components (oligomers) that dissolve in water but for the most part the PAC is insoluble in water. The system which forms therefore is a solid/liquid system in which water soluble portions of the PAC are extracted into water. The majority of the PAC remains in solid particulate form.

Agglomeration of the ground particles is a potential problem during water addition. This may be controlled by the use of a surfactant. Also stirring of the mixture may be useful to prevent particle agglomeration. Also, the use of ultrasound decreases agglomeration and speeds up the extraction of cyclic carbonate. Useful surfactants are inert to the PAC and all components of the process. These might be anionic, ionic or non ionic surfactants well known in the art.

One purpose of the water addition is to remove certain impurities from the crude PAC. Such impurities include cyclic carbonates such as propylene carbonate. Other impurities might be epoxides, toluene, DCM, acetone, and methanol or water soluble hydrolysis product impurities.

In order to remove impurities and encourage those to partition into the water phase it is preferred to heat the water/PAC system. Again, heating should be effected carefully. Heating too fast can encourage agglomeration of particles. Stirring the mixture to prevent agglomeration is again useful. The mixture can be heated to up to 200° C., such as up to 150° C., e.g. up to 120° C. Heating should be to at least 35° C., such as at least 40° C. Ideal heating range may be 50 to 90° C. This may be carried out stepwise. It is particularly preferred if heating is carried out in two or more stages. In a first stage therefore, the mixture is heated to a temperature of no more than 70° C. and held at that temperature for a period of time. Thereafter, a second heating step can be carried out in order to increase the temperature to for example up to 100° C. This water contact step can last from seconds or more such as 15 mins to 2 hours or more.

The water does not dissolve the polycarbonate but during the process and in particular due to the heating, impurities such as the cyclic carbonates partition into the water phase. After this step, the blend can be filtered. The water layer can be removed and this may contain at least some of the cyclic carbonate impurity, hydrolysates, solvent and so on. Moreover, some of the low molecular weight oligomers or ether content from the polymer may also be removed in the water layer. This is beneficial as these components tend to give migration in the final polymer. Unlike the organic solvent solution however, the amounts removed are small.

The precipitate which is left will typically still contain catalyst residues but it will be substantially free of cyclic carbonate impurities, e.g. less than 0.5 wt % of such impurities. Further reductions in the amount of impurity can be made by heating for longer or heating to a higher temperature, changing the extractive medium or starting a new extraction step.

An important feature of the invention is that the amount of water used in the process is much less than the amount of organic solvent typically used per kg of PAC. It is preferred if the amount of water added is less than 75% the amount of organic solvent needed to achieve the same outcome. Typically, water based treatment uses ~½ of the total amount of solvents compared to the solvent based method.

The method of the invention does not involve the use of toxic organic solvents. Moreover, typically for PPC, solvent based treatment per 1 kg PAC involves treatment with 30 liters of organic solvents and 10 liters of aqueous acid residues. Water based treatment per 1 kg of PAC might involve 10 liters of aqueous acid.

In addition, the byproduct water phase is cheaper to purify for disposal. Purification of aqueous solutions of the invention may use known membrane based purification processes. Solvent based processes have to rely on distillation. Membrane based processes are much less energy intensive than distillation based processes. All in all, the water based processes may have a much lower carbon footprint.

Moreover, the Tg of the PAC and thermal decomposition temperature of the PAC are higher for same level of water as solvent.

It is within the scope of the invention to add up to 10 wt % of the PAC to the water, e.g. up to 5 wt % PAC in water. Preferably the amount of PAC is 1 to 10 wt % relative to the amount of water added, e.g. 1 to 4 wt %.

The precipitate which forms after water addition is preferably particulate. Particles may be around 0.5 to 5 mm in diameter. It is also possible however for the precipitate to be ground at this stage. In sharp contrast, where organic solvents are used in the purification procedure, the precipitate that forms is a lump at this stage in the process. It is especially preferred therefore if directly after the water removal, the PAC is in the form of particles of up to 5 mm in diameter.

The precipitate may need drying. This can be effected conventionally, bearing in mind that temperature control to prevent degradation is important. Drying under reduced pressure or simply in ambient air are possibilities.

In terms of Tg and thermal decomposition temperature, the use of water alone in the purification procedure does not change these values relative to PACs produced using conventional organic solvent purification procedures. In order to change these temperatures, the use of an acid is required during purification.

Addition of Acid

In a preferred embodiment, acid should be added to the PAC as well as the water. Conveniently, that is achieved by predissolving the acid in water to make an acid solution although in theory the acid could be added separately.

That acid can be a mineral acid or organic acid. The term organic acid here is used to cover compounds containing both the COOH group and disguised acids based on anhydrides. Preferably, it is an organic acid which is monofunctional (i.e. comprises one COOH group) or is polyfunctional (i.e. comprises more than one carboxyl group or comprises an anhydride group). Preferably, the acid contains at least one COOH group. Acid mixtures can also be employed.

Suitable mineral acids include HCl, $HNO_3$ and $H_2SO_4$. The concentration of a mineral acid solution may be 0.01 to 3 wt/vol %. Ideally however, the use of mineral acids is avoided. It is more preferred to use organic acids.

Organic acids of use in the invention are preferably small molecules with a Mw of less than 300 g/mol. The use of polyacrylic acids or copolymers of acrylic acid or copolymers containing maleic anhydride as comonomer is also especially envisaged. As well as COOH groups, acids of interest may contain OH groups and C=C bonds. Preferably no other functional groups are present. It will be appreciated that acids may come in particular forms, e.g. as hydrates or salts.

Suitable monofunctional acids contain one COOH group and may be based on the formula RCOOH where R is a C1-6 alkyl or alkenyl group, optionally substituted by an OH group. Such acids include formic acid, acetic acid, propanoic acid, lactic acid, acrylic acid and crotonic acid. Methacrylic acid is also an option.

Polyfunctional acids comprise at least two COOH groups or an anhydride group. Preferred acids are those comprising two COOH groups only or one anhydride group. Acids of general formula HOOC—R'—COOH are preferred where R' is a C2-6 alkyl or alkenyl group optionally substituted by an OH group. Preferred acids include maleic acid, glutaric acid, and citric acid. Also envisaged, is the use of anhydrides such as maleic anhydride, acetic anhydride, trimellitic anhydride, pyromellitic anhydride. Polymeric acids are also possible. These include polyacrylic acid or copolymers or terpolymers of acrylic/methacrylic acid or copolymers or terpolymers containing maleic anhydride as comonomer, i.e. poly(acrylic acid-co-maleic acid), poly(acrylamide-co-acrylic acid-co-maleic anhydride), poly(ethylene-co-acrylic acid), and poly(styrene-co-acrylic acid).

It is possible to use mixtures of monofunctional acids, mixtures of polyfunctional acids or a mixture of monofunctional acid with polyfunctional acid.

The amount of acid present can vary. Typically the amount of acid added to water is 0.01 to 5 wt %, preferably 0.1 to 3 wt %. The use of a 1 wt % mixture of acid in water is highly preferred. Higher acid concentrations encourage higher thermal decomposition temperatures and also acid catalyzed hydrolytic random chain scission.

The contact times and amounts of acid solution added are the same as those discussed above in relation to water treatment. The actual purification procedure, e.g. stirring is also the same.

The aqueous acid solution is contacted with the PAC. Again, the PAC is not dissolved by the acid solution. Also, the addition of an acid to the material does not significantly affect the level of cyclic carbonate impurity in the treated composition relative to treatment with water alone, although it may encourage its hydrolysis. The Tg of the acid treated PAC and the Tg of the water only treated PAC are approximately the same, within 2 to 4 degrees. If anything, the Tg of the acid treated samples is 0.5 to 2.0° C. higher than the water treated PACs. These values are elevated relative to the crude PAC, e.g. to values of 40° C. or more for PPC.

After acid addition the precipitate which forms is preferably particulate. Particles having a particle size of less than 5 mm in diameter are preferred such as 0.5 to less than 5 mm in diameter.

The more interesting behaviour is observed with the thermal decomposition of the PACs. The protocol for measuring thermal decomposition is given in the test section of the application. It has been surprisingly found that the addition of monofunctional acids at certain concentrations in water reduces the thermal decomposition temperature relative to the addition of water alone. However, it has been found that the addition of polyfunctional organic acids increases thermal decomposition temperature relative to water alone. This allows therefore the skilled person to tailor the decomposition temperature of the PAC by careful selection of the purification procedure. The increases/decreases here are relative to a PAC worked up under otherwise identical conditions in the presence of water but in the absence of the acid.

Mineral acids seem to have differing effects on the thermal decomposition (TGA) temperature. HCl for example, reduces thermal decomposition temperature.

The addition of monofunctional acids has also been found in some cases to reduce the content of catalyst residues in the worked up PAC. In contrast, polyfunctional acids may not reduce metal residue content.

It is believed that the PACs are not end capped in the process of the invention. In particular, end capping involves the formation of a covalent bond between the end capping group (here the acid) and the end of the polymer chain (possibly an OH group). The inventors have found that if, after contact with the acids the material is washed with methanol or in polar highly coordinating solvents, the thermal decomposition temperature is the same as that achieved using water alone. A methanol wash would not remove end capped materials as it could not cleave a covalent bond. This suggests therefore that the elevation of thermal decomposition temperature is as a result of some other interaction which does not involve end capping of the PAC. It is therefore preferred if the end groups of the PACs made by the process of the invention are not capped by the process of the invention. This may leave OH groups free at the polymer ends and open up therefore new applications for these thermally stable PACs e.g. in polyurethane formation.

Without wishing to be limited by theory, it is envisaged that the increase in thermal decomposition temperature is a result of interaction between the acid and metal residues in the polymer. It is preferred therefore if the PAC's of the invention comprise 0.5 wt ppm to 100000 wtppm of metal ions, such as 0.5 wt ppm to 10000 ppm, e.g. 10,000 to 20,000 wtppm or 5 to 20 wtppm. As the compound which forms here is not attached to the PAC it may be capable of being washed away by methanol or polar highly coordinating solvents. It is a particular feature of the invention therefore that thermal decomposition temperature may be changed in the compositions of the invention by washing with methanol or polar highly coordinating solvents.

Metal Ions

As noted above, the presence of metal ions in the PAC is believed to be important for thermal properties. It is believed that the presence of metal ions in the PAC enables an interaction between the polyfunctional acid and PAC chain which results in an increase in thermal stability. In a highly preferred embodiment, the PAC's used in the invention preferably comprise at least 0.001 wt %, e.g. at least 0.005 wt %, preferably at least 0.01 wt % of metal ions. This figure is based on the content of metal ions in the PAC/metal ion mixture.

It will be appreciated therefore that PAC's made by the process of the invention should comprise at least 0.001 wt % of metal ions, preferably at least 0.01 wt %.

The metal ions are present as part of a compound. Typically, the PAC should contain less than 5 wt %, such as less than 3 wt %, e.g. less than 2.5 wt % such 2 wt % or less of the metal compounds. This amount is based on the metal compound in question not simply the metal ion itself.

The metal ions may originate from residual catalyst present in the PAC following its preparation, or from metal compounds added after polymerisation is complete.

Alternatively viewed the metal ion content of the PAC is preferably at least 50 ppm, preferably at least 100 ppm, e.g. at least 500 ppm, especially at least 900 ppm. In most embodiments of the invention the metal ion content of the PAC will be at least 1500 ppm.

It will be appreciated that it is generally accepted practice to remove as much metal ions as possible after PAC synthesis. These are generally considered an impurity. There are good reasons for the metal ion removal. In some cases active catalyst residues are detrimental to thermal stability. In some cases the catalyst residues catalyze the degradation of the PAC via a chain unzipping mechanism.

In PACs prepared using cobalt catalysts, the catalyst is red and must be removed if a colourless product is wanted. It is therefore conventional to remove catalyst residues. However, it may be useful in the present invention to leave those residues in the PAC or control their removal such that some residues still remain.

Many commercially available PACs are heavily treated to ensure metal residue removal however, and it may therefore be necessary to add metal residues to such polymers to carry out the preferred embodiment of this invention.

When added separately, the metal may be in any form, e.g. any metal salt such as a metal chloride, fluoride, bromide iodide, nitrate, sulphide, sulphate, carbonate, silicate, aluminosilicate, phosphate, borate, selenide, oxide or telluride. In particular, the oxide of the metal can be used or especially an organometallic compound containing the metal ion such as a carboxylate, e.g. glutarate. It is also possible to use a mixture of two or more metals compounds.

It is envisaged that the metal ion in becomes non covalently associated with the PAC chain. It is ideal therefore if the metal ion is added in the form of a complex thereof with a ligand. It may also be that the ligand makes non covalent interactions with the PAC.

It is particularly preferred if the metal compound is a carboxylate such as a monocarboxylate, dicarboxylate, tricarboxylate, or any polyfunctional carboxylate. Metal adipates, glutarates, stearates and acetates are also envisaged. In general, a ligand which is capable of making complexes with the metal and which is capable of making of secondary interactions (hydrogen bonding, etc) with the PAC is envisaged here.

The metal compound added is preferably one which is water insoluble (e.g. 1 g/L or less). In all cases, the metal residues are preferably transition metal or group II to IV metal residues.

Preferable transition metal residues include those of the first row in the Periodic Table, such as Zn, Mn, Ti, Cu, Fe or Co. Preferred Group II to IV metals include Zn, Ca, Mn, Ti, Mg, Zr and Al. Other interesting metals are cadmium, silver, gold, platinum, iron and palladium. In a particularly preferred embodiment, the metal residue is a Zn, Ca, Mn or Co residue, especially Zn. Most especially, the residues derive from catalyst which remains in the PAC after its synthesis, most especially Zn residues which are present. The valency of the metal is preferably its most stable valency. This should be at least 2+.

It is envisaged that after a fairly typically polymerisation process using a Zn gluturate catalyst, the Zn gluturate content is close to 1.0 wt % in the crude polymer product. Preferably metal ion levels should be at least 100 ppm, preferably at least 1000 ppm. It is envisaged that after a fairly typical polymerisation process using a dizinc macrocyclic ligand like in Kember 2009, the zinc catalyst content is at less than 1.0 wt %.

The onset of the main thermal degradation (an indicator of the thermal stability) of the poly(alkylene carbonate) of the invention can be in the range 210 to 300° C. In particular 240 to 280° C., such as 250 to 280° C. Alternatively, the value may be 210 to 240° C., such as 215 to 230° C.

Another environment where this purification is an advantage is when a PAC that has already been worked up with organic solvents, such as commercially supplied PACs. Some content of cyclic carbonates and organic solvents (e.g. dichloromethane, acetone, propyl acetate, toluene, methanol, ethanol) may be left over and sometimes also considerable amounts of epoxides can be present. These compounds can be extracted in to the aqueous phase or hydrolyzed into soluble compounds and extracted to the aqueous phase.

It is envisaged that the PACs purified by in the invention may be solid, in particular, particulate or granulate.

Applications

The PAC's produced by the process of the invention are suitable for use in a variety of applications. They might be used in moulding applications or for film forming or in lamination. In particular, they are well suited for use in the preparation of articles such as bottles and containers. Alternatively, they could be utilised in circuit boards as sacrifice polymers. The invention allows the formation of poly(alkylene carbonate)s with particularly low thermal decomposition temperatures. This may have particular advantage in sacrifice polymer applications.

The polymers with higher thermal decomposition temperature can be extruded at higher temperatures than is conventional for these materials. This fact also allows the blending with polymers that require higher processing temperatures such as HDPE, polypropylene, PLA, polyamides, PET, PVC and so on. It is a further feature of the invention therefore if the PACs formed by the process of the invention are extruded at a temperature of at least 190° C.

The invention will now be described with reference to the following non limiting examples and figures. FIG. 1 shows the thermal stability of the PACs of the invention depending on the work-up procedure. The WH1 reference is worked up using a state-of art-procedure as described by Kim, J. S. et al. J. Pol. Sci.: Part A: Polymer Chemistry, Vol. 43, 4079-4088 (2005). This utilises organic solvent.

Figure 2:
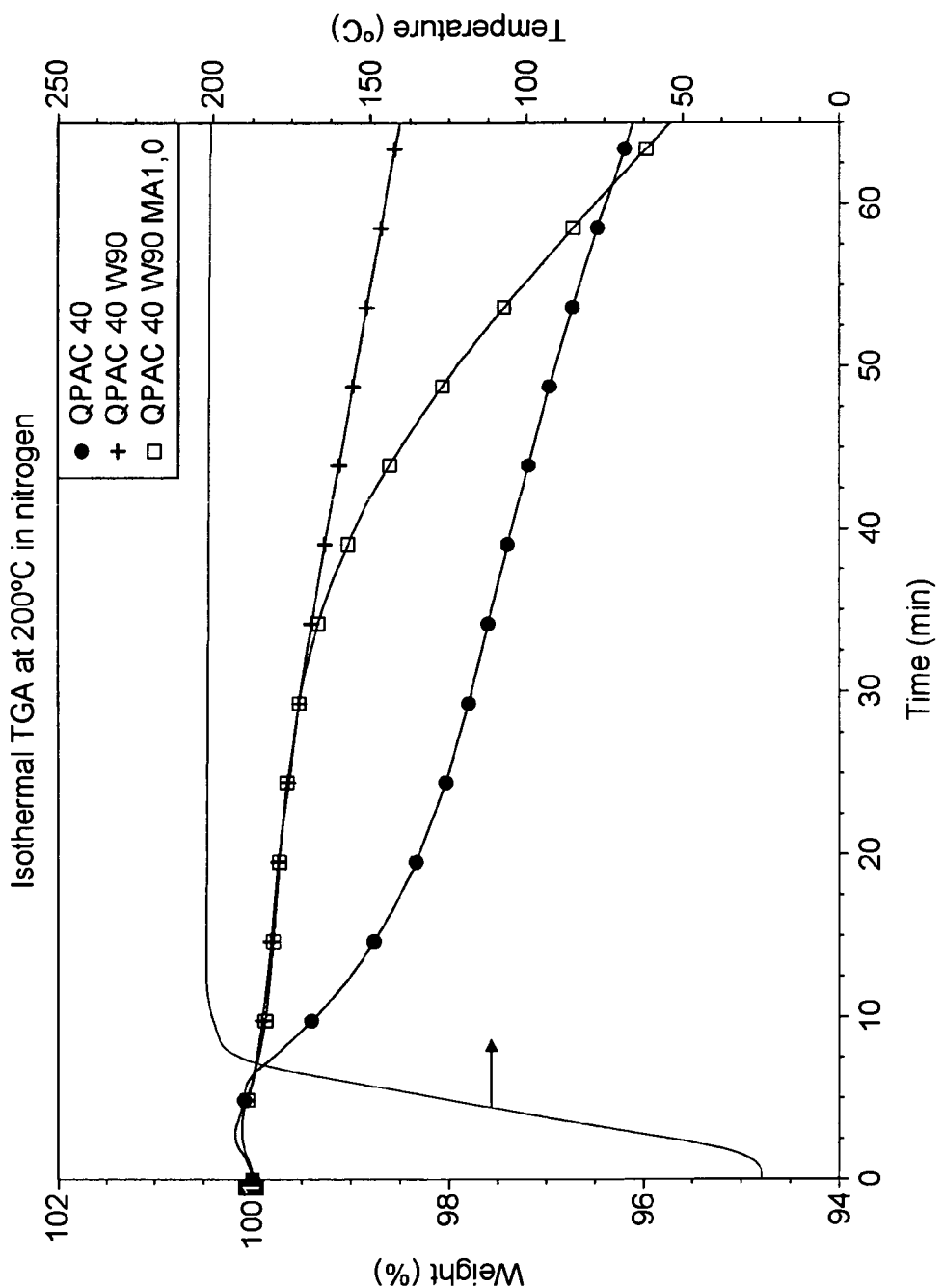

FIG. 2 also shows thermal stability depending on the work-up and modification of QPAC.

Figure 3A:
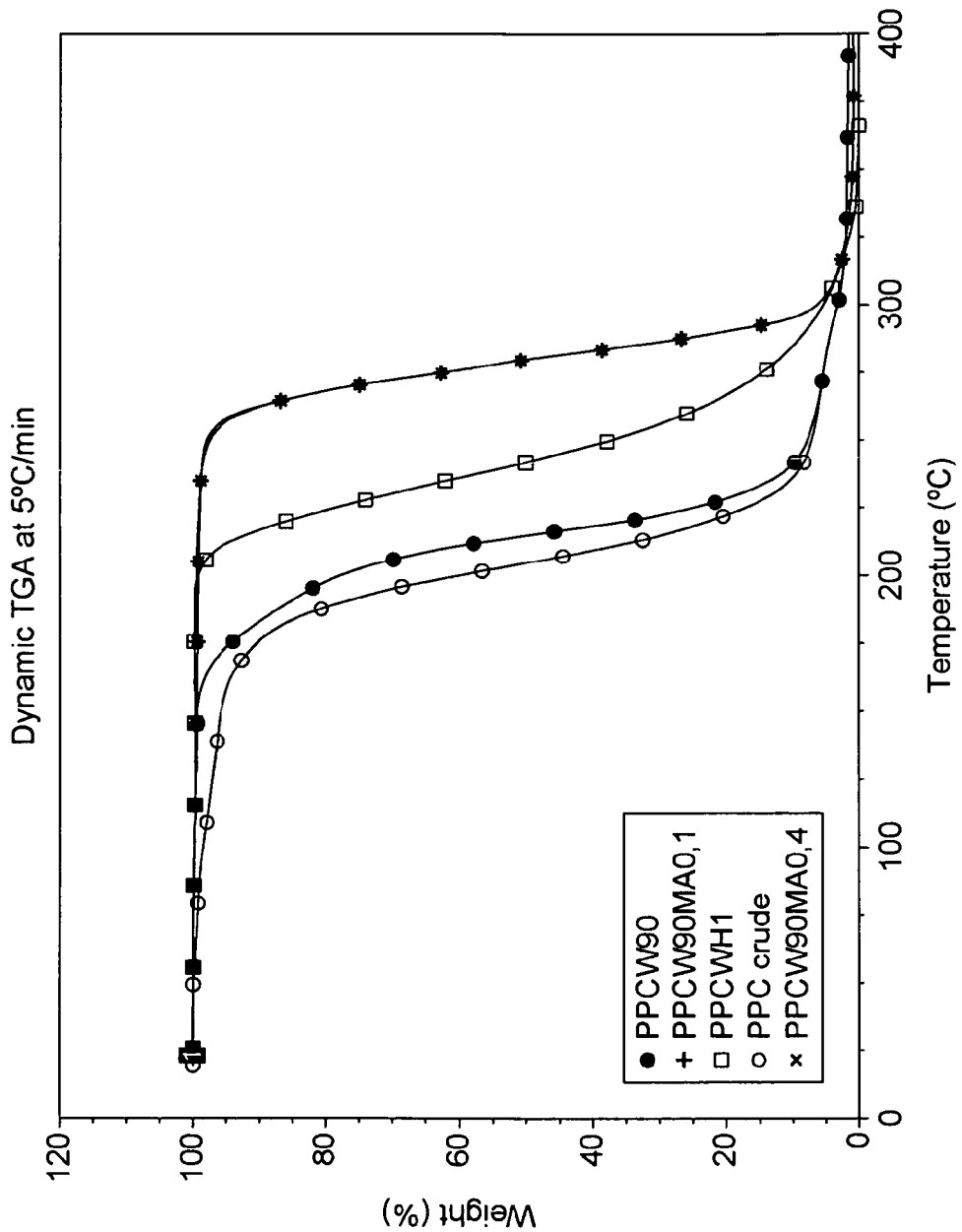
Figure 3B:
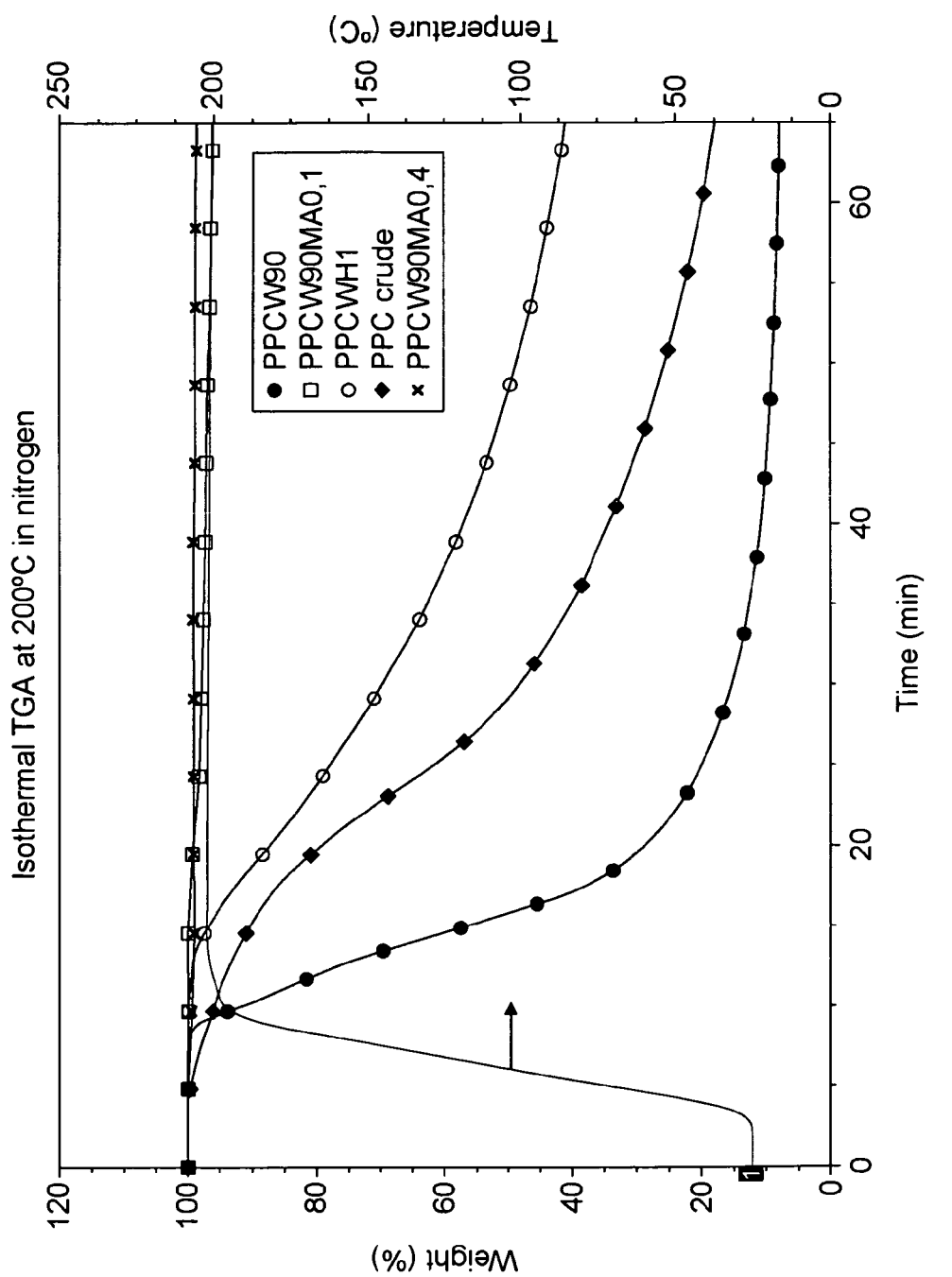

FIG. 3 shows the enhancement in the thermal stability depending on the concentration of maleic anhydride (MA 0, 0.1 and 0.4%) used in the purification of PPC from Zn glutarate compared to the crude sample and a sample worked up in organic solvents and hydrochloric acid (WH1). FIG. 3A shows the results of dynamic TGA characterization where the onset of the thermal degradation is improved after the addition of MA when compared to the other samples. FIG. 3B shows the isothermal TGA characterization at 200° C. for the same set of samples. In this figure the samples purified with MA show much higher stability at the testing conditions after an extended period of time (>60 min). This fact may improve the processability by decreasing the degradation at higher temperatures (>190° C.) broadening in this way the application window of PACs limited by their modest thermal stability when compared to other polymers like polyamides, polyesters and polyolefins.

Analytical Methods:

FTIR

Fourier Transformed Infrared Spectroscopy (FTIR): IR spectra in ATR mode were recorded in a Perkin Elmer Spectrum GS FTIR Spectrometer. For the measurement cast films were prepared by dissolution of the polymers (~0.7 g) in MeC12 (~20 ml) followed by drying overnight at 30° C. in oven. The removal of the Zn glutarate and propylene carbonate was qualitatively evaluated from the intensity decrease in the absorption at their characteristic wave numbers, at 1530 cm$^{-1}$ and 1800 cm$^{-1}$, correspondingly.

The amount of propylene carbonate estimated from the FTIR spectrum at the 1800 cm$^{-1}$, using a model calibrated from $^1$H-NMR.

TGA (Onset of Decomposition):

TGA was measured on a PerkinElmer TGA analyzer according to ISO11358. the analyses were run up to 550° C. in nitrogen with a heating rate of 20° C./min or alternatively at 5° C./min.

TGA (Isothermal):

TGA was measured on a TA TGA analyzer according to ISO11358. The analyses were run during one hour at 200° C. in nitrogen. The samples typically reach the target temperature approximately after 10 minutes heating from room temperature DSC (Tg):

DSC was measured on a Netzsch 204-F1 instrument according to ISO11357-2 for determination of glass transition temperature: 1. heating; −10 to 140° C., cooling; 140 to −10° C., 2. heating; −10 to 140° C. Heating/cooling rate was 20° C./min. The evaluation of the glass transition temperature is performed at the second heating segment. The sample specimens are pellets.

Preparation Example 1

Polypropylene Carbonate (PPC)

Propylene oxide (260 ml) and zinc glutarate (3 g) were placed in a 2 dm$^3$ stainless steel autoclave reactor with an impeller. $CO_2$ was added to the reactor and the temperature was raised to 60° C. The pressure was maintained at 30 bars by replenishing $CO_2$ at regular intervals throughout the reaction time of 40 hrs. The reaction was terminated by venting $CO_2$ and removing excess monomer by distillation. The crude polymer was recovered as a solid that contained 1.7 wt % zinc glutarate. The propylene carbonate content was estimated as 5% from FTIR. The product was dissolved in dichloromethane, diluted hydrochloric acid was added, the aqueous phase was removed, and the polymer was precipitated by the addition of methanol. The poly(propylene carbonate) was dried to yield a white solid that was analysed by GPC, FT-IR, $^1$H NMR. Mw; 665000; Mw/Mn=3; ether linkages: 9 mol %), TGA (onset) at =237 (5° C./min)

Preparation Example 2

Grinding

Crude polymer lumps were cut using scissors to an average size of 1 cm, then the particles were submerged in liquid nitrogen and milled to particle sizes lower than 1 mm. The particles were immediately dispersed in water to minimize agglomeration.

As well as preventing heat generation, the cooling effect of the liquid nitrogen provides the polymer with a stiffness that allows the polymer to be cut by the mill blades. It also keeps the polymer as a powder avoiding an undesired sintering that occurs when the particles gain heat by the friction between the mill blades and the polymer.

The following compounds are used in the examples which follow:

| Acid Compound | Abbreviation | Concentration % | Presentation | Producer |
|---|---|---|---|---|
| Citric Acid | CA | >99.5% | Powder | Fluka |
| Maleic Anhydride | MA | >99% | Lentils | Merck |
| Formic Acid | FA | >98% | Liquid | Merck |
| Acetic Acid | AA | >99.9% | Liquid | Merck |
| Hydrochloric Acid | HCl | 32% | Liquid | Merck |
| Potassium bisulfate | KHSO4 | 99% | Powder | Fluka |
| Glutaric Acid | GA | 99% | Powder | Aldrich |

General Protocols

Solid-liquid extraction: A 2/100 ratio (wt (g)/(ml)) of ground polymer from example 1 in water was used as a base suspension throughout this study. Two grams of the ground polymer are placed in 100 ml erlenmeyers under magnetic stirring (in general 400 rpm) and subjected to different temperature programs. The temperature program was: 60° C. for 30 min followed by 90° C. for 3 h. The intermediate stage at 60° C. permits the formation of agglomerates of smaller size than when 90° C. is used as starting temperature.

After the acid extraction the aqueous acid was removed and 2 repeated washes with 100 ml of water were done consecutively.

Drying

After the extraction the particles were left in oven at 30° C. over night.

Example 1

Water Purification (No Acid)

Solid powder of crude polypropylene carbonate (containing approx 4 wt % propylene carbonate and a Tg of 24° C.) was obtained by the copolymerization of carbon dioxide and propylene oxide in presence of Zn Glutarate as described in example 1 and ground to less than 0.5 mm. This was dispersed in water (2 g of solids in 100 ml of water) and the temperature was increased to 90° C. and held for 3 hours at isothermal conditions as above. The aqueous residue was removed and the solids washed under strong stirring with cold water. The resin was dried at room conditions overnight and then characterized.

The resin after the procedure has approx.<0.5% of propylene carbonate (from FTIR) and a Tg of 40° C. The final morphology of the polymer was improved relative to one produced using organic solvent based purification. Particles of approximately less than 2 mm are formed. The improved morphology is shown in FIG. 2. The Example 1 polymer shows an enhanced onset of the thermal decomposition compared to the crude resin (See FIG. 1). Despite this, catalyst residues of zinc glutarate have been partially extracted only (from FTIR at 1530 cm$^{-1}$). The increase in the thermal stability evidences the (at least partial) deactivation of catalyst residues.

Example 2

Acetic Acid

Solid powder of crude polypropylene carbonate (as described in example 1) was dispersed in a 1 wt % acetic acid solution (2 g of PPC in 100 ml of acetic acid solution). Progressively the temperature was increased to 90° C. and held for 2 hours at isothermal conditions. The aqueous residue was removed and the solids washed thoroughly multiple times under strong stirring with cold water in order to remove acid residues. The resin was dried at room conditions overnight and then characterized.

The onset of the thermal degradation for Example 2 compared to the crude polymer decreases (See FIG. 1).

Example 3

Formic Acid

Example 2 is repeated but using a 1% formic acid solution rather than acetic acid solution. After comparing the thermal decomposition of Example 3 vs crude PPC (in FIG. 1) the same behaviour is observed, i.e. the onset of the thermal degradation is lowered.

The presence of a reduced speed of decomposition and lower onset of thermal stability may suggest the enhancement of the chain unzipping mechanism.

Example 4

Maleic Anhydride

Solid powder of crude PPC (as example 1) was dispersed in an aqueous solution of 1% maleic anhydride (2 g of solids in 100 ml of acid solution). Progressively the temperature is increased to 90° C. and held for 2 hours at isothermal conditions. The aqueous residue was removed and the solids washed thoroughly twice under strong stirring with cold water in order to remove acid residues. The resin was dried at room conditions overnight and then characterized.

The onset of the thermal degradation for Example 4 compared to the crude polymer and the polymer worked up only with water (W90) is enhanced (See FIG. 1). The resin after the procedure has approx.<0.5% of propylene carbonate (from FTIR) and a Tg of 40° C.

Example 5

Citric Acid

Example 4 was repeated but using 1% citric acid solution. The onset of the thermal degradation for Example 5 compared to the crude polymer and the polymer worked up only with water (W90) (See FIG. 1).

Example 6

Glutaric Acid

Example 4 was repeated but using 1% glutaric acid. The onset of the thermal degradation for Example 6 compared to the crude polymer and the standard water purification is enhanced (See FIG. 1).

It is observed in FIG. 1 that catalyst residues are close to 1% above 320° C. in W90MA1,0, W90CA1,0 and W90GA1,0 samples. This fact reflects that the catalyst residues were not completely extracted. Comparing with the prior art in the scientific literature, the increase of the temperature for the onset of the thermal decomposition and the aqueous medium (decreasing the possibility of the esterification of hydroxyl groups to occur) suggests that the enhancement does not occur via end capping but probably by metal ion coordination. Probably metal complexes were formed after the reaction of the catalyst residues and the polycarboxylic acids. These complexes may stabilize the PPC chains against the thermal degradation.

Comparative Example 1

10 g of solid powder of PPC, made as in example 1, was dissolved in 100 ml DCM, washed with 80 ml HCl (0.5%) and washed with 80 ml of water. The aqueous phase was removed after each of the previous steps and the PPC precipitated by addition of 160 ml of methanol. The precipitates were separated from the liquid phase and dried during 48 h at 35° C. The FTIR shows a larger content of cyclic carbonate than in any of the examples 1-6 and a lower onset of the decomposition measured by dynamic TGA (5° C./min in N2) than in the examples 4, 5, 6 (where maleic anhydride, citric acid and glutaric acid were used) and higher than in the examples 1, 2, 3 (where no acid or acetic acid and formic acid were employed).

Example 7

Commercially available PPC from Empower Materials under the tradename of Qpac40 is used. The polymer has a propylene carbonate content close to 3% (from FTIR) and a Mw 120000. Mw/Mn: 4 measured by GPC Solid powder of QPAC 40 is dispersed in an aqueous solution of maleic anhydride 1% (160 g of solids in 2000 ml of solution). Progressively the temperature is increased to 90° C. and held for 2 hours at isothermal conditions. The aqueous residue is removed and the solids are washed thoroughly multiple times under strong stirring with cold water in order to remove acid residues. The resin is dried at during 72 h under nitrogen then characterized. The amount of cyclic carbonate is reduced and the thermal stability increased compared to the crude Qpac 40 (See FIG. 2).

Example 8

QPAC Water

Solid powder of QPAC40 was dispersed in water (160 g of solids in 2000 ml of solution). Progressively the temperature was increased to 90° C. and held for 2 hours at isothermal conditions. The aqueous residue was removed and the solids were washed thoroughly multiple times under strong stirring with cold water. The resin was dried at during 72 h under nitrogen then characterized. The amount of cyclic carbonate is reduced and the thermal stability increased compared to the crude Qpac 40 (See FIG. 2).

It is also evident from FIG. 3, that the use of MA has a positive influence in thermal stability relative to water alone. Water treatment effectively removes cyclic carbonate and increases the processability of QPAC40 by increasing its thermal stability even at its low level of catalyst residues.

Example 9

Maleic Acid

Copolymerisation:
Propylene oxide (400 ml), zinc glutarate (1.2 g,) and 400 ml of DCM were placed in a 2 $dm^3$ stainless steel autoclave reactor. $CO_2$ was added to the reactor and the temperature was raised to 60° C. The pressure was maintained at 30 bar by replenishing $CO_2$ at regular intervals throughout the reaction time of 40 hrs. The reaction was terminated by venting $CO_2$ and removing excess monomer and DCM by distillation. The crude polymer was recovered as a solid that contained 1.57 wt % zinc glutarate. The propylene carbonate content was estimated as 4% from FTIR. The molecular weight determined by GPC was Mw 485000, Mw/Mn: 3.1

10 g of solid powder of crude PPC, was dissolved in 100 ml DCM, washed with 80 ml HCl (0.5%) and washed with 80 ml of water. The aqueous phase was removed after each of the previous steps and the PPC precipitated by addition of 160 ml of methanol. The precipitates were separated from the liquid phase and dried during 48 h at 35° C.

Solid powder of crude PPC (as described in the previous paragraph) was dispersed in neat water (PPCW90) and in aqueous solutions of 0.1% and 0.4% of maleic anhydride (PPCW90MA0,1 and PPCW90MA0,4). Progressively the temperature is increased to 90° C. and held for 2 hours at isothermal conditions. The aqueous residue was removed and the solids were washed thoroughly twice under strong stirring with cold water. The resin was dried during 72 h at 35° C. under nitrogen flushing The thermal stability at 200° C. for the W90MA0,4 and W90MA0,1 samples is improved when compared to the worked sample in neat water PPCW90 and the sample worked up in organic solvents (WH1). The thermal stability improvement can be quantified from the isothermal and dynamic TGA characterizations shown in FIG. 3. In especial, from the isothermal TGA results it is shown that the samples treated with maleic acid are much more stable at 200° C. than the samples worked up in organic solvents and in neat water.

Example 10

PCHC from (Di-Zn-L2) with Formic Acid

A di-zinc catalyst prepared as described in Kember et al. Angew. Chemie Int. Ed., 2009, 48, 931-933 is used. Cyclohexene oxide (243 g, 2.46 mol) and di-zinc catalyst (0.2 g, 0.25 mmol) were placed in a 1.8 dm³ stainless steel autoclave reactor. The temperature was raised to 80° C. and $CO_2$ is added to the reactor to obtain a pressure of 10 bar and then maintained under these conditions during 25 h. The reaction was terminated by venting $CO_2$ and removing excess monomer by distillation. The crude polymer was recovered as a solid.

Powder from crude polymer was worked up as in the examples 3 and 4 using aqueous solutions of formic acid 0.1% (FA) and maleic anhydride 1% The main results from the characterizations of crude and worked up samples are shown in Table 1. The content of cyclohexene carbonate is decreased after both purifications in FA and MA. Thermal stability in one hand is increased after the treatment in MA and on the other hand decreased after the treatment in FA. The Zn content is decreased during both purifications, especially after the FA treatment.

TABLE 1

Characterization of crude and worked up PCHC produced with a bi nuclear Zinc Catalyst

| Sample Name | Zn Content (a) Wt ppm | Cyclic carbonate content (b) | $T_{1onset}$ (c) (° C.) |
|---|---|---|---|
| PCHC crude | 510 | reference | 186 |
| PCHCW90FA1,0 | 290 | decreased | 182 |
| PCHCW90MA1,0 | 480 | decreased | 219 |

(a) from atomic absorption
(b) from FTIR ATR, peaks around 1803 and 1822 cm−1
(c) Temperature at the onset of the main thermal degradation from Dynamic TGA in nitrogen at 10° C./min

Example 11

PCHC from Zn Glut with Maleic Anhydride

Cyclohexene oxide (193 g, 1.97 mol), dichloromethane (200 ml) and zinc glutarate (1.1 g, 5.6 mmol) were placed in a 1.8 dm³ stainless steel autoclave reactor. $CO_2$ was added to the reactor and the temperature was raised to 60° C. The pressure was maintained at 40 bar by replenishing $CO_2$ at regular intervals throughout the reaction time of 40 hrs. The reaction was terminated by venting $CO_2$ and removing excess monomer by distillation. The product was dissolved in dichloromethane, diluted hydrochloric acid was added, and the polymer was precipitated by the addition of methanol. The poly(cyclohexene carbonate) was dried to yield a white solid that was analysed by GPC and $^1$H NMR: Mw; 106 000; Mw/Mn=8.3; ether linkages: 28 mol %)

Powder from crude polymer was worked up as in the example 4 using aqueous solutions of maleic anhydride 1%(W90MA1,0) The main results from the characterizations of crude and worked up samples are shown in Table 2. The content of cyclohexene carbonate is decreased after the purification in MA. Thermal stability in one hand is increased and on the other hand the Zn content is decreased after the treatment in MA.

TABLE 2

Characterization of crude and worked up PCHC produced with Zn glutarate catalyst

| Sample Name | Zn Content (a) Wt ppm | Cyclic carbonate content (b) | $T_{1onset}$ (c) (° C.) |
|---|---|---|---|
| PCHC crude | 7700 | reference | 267 |
| PCHCW90MA1,0 | 3300 | decreased | 292 |

(a) from atomic absorption
(b) from FTIR ATR, peaks around 1803 and 1822 cm−1
(c) Temperature at the onset of the main thermal degradation from Dynamic TGA in nitrogen at 10° C./min

Example 12

PPC from a Cobalt Catalyst with Maleic Anhydride and Acrylic Acid

The following example illustrates the use of the aqueous treatment with acrylic acid and maleic acid to improve the thermal stability of PACs with Cobalt catalyst residues from their preparation Propylene oxide (100 g), dichloromethane (25 ml) and (1R, 2R)-1,2-cyclohexanediamino-N,N'-bis(3,5-di-tbutylsalicylidene)-Co(III)-trichloroacetate (1 g, 1.31 mmol) prepared as described by Lu et al. (Macromol. 2006, 39, 5679-5686) and bis(triphenylphosphine)iminium chloride (PPNC1; 0.75 g, 1.31 mmol) were placed in a 2 dm³ stainless steel autoclave reactor. $CO_2$ was added to the reactor and the temperature was adjusted to 25° C. The initial pressure was 20 bar and the reaction time was 4 h. The reaction was terminated by venting $CO_2$ and removing the monomer and solvent by distillation under vacuum. 5 g of the resin was dissolved in dichloromethane (30 ml), methanol (60 ml) was added, the precipitate was collected and dried (30° C./48 h, nitrogen atmosphere). The resulting orange solid resin contained 0.05 wt % of cobalt catalyst residues (analysed by TGA from the weight residue at 450° C.). The product was cryomilled and the resulting powder was further worked up as in Example 4 using aqueous solutions of maleic anhydride 0.4 wt %(W90MA0,4) and acrylic acid 1.0 wt % (W90Acr1,0). The main results from the characterizations are shown in Table 3. Thermal stability in samples treated with aqueous maleic acid and acrylic acid observe an improvement compared to the untreated sample.

TABLE 3

Characterization of crude and worked up PPC produced with a Cobalt based catalyst

| Sample Name | Wt % Residues at 450° C. (a) | $T_{1onset}$ (b) (° C.) |
|---|---|---|
| PPC | 0.05 | 197 |
| PPCW90MA0,4 | 0.1 | 227 |
| PPCW90Acr1,0 | 0.2 | 235 |

(a) from Dynamic TGA in nitrogen at 10° C./min
(b) Temperature at the onset of the main thermal degradation from Dynamic TGA in nitrogen at 10° C./min

The invention claimed is:
1. A process for purifying a poly(alkylene carbonate), comprising the steps of:
(i) adding the poly(alkylene carbonate) to water or an aqueous acid solution in the absence of any organic solvent to form a solid:liquid blend, the poly(alkylene carbonate) having a particle size less than 5 mm,

(ii) heating the solid:liquid blend to a temperature of up to 200° C.; and
(iii) removing the liquid from the solid:liquid blend, thereby leaving a solid residue, and optionally drying the residue.

2. The process of claim 1, wherein the poly(alkylene carbonate) is added to the aqueous acid solution.

3. The process of claim 1, wherein the poly(alkylene carbonate) is prepared by:
(a) reacting carbon dioxide with a cyclic ether in the presence of a catalyst and an organic solvent so as to form a crude poly(alkylene carbonate) in the organic solvent;
(b) removing the organic solvent from the crude poly(alkylene carbonate); and
(c) optionally converting the crude poly(alkylene carbonate) into particles having a particle size less than 5 mm.

4. The process of claim 1, wherein the poly(alkylene carbonate) is a copolymer of carbon dioxide and one or more of propylene oxide, ethylene oxide or cyclohexene oxide.

5. The process of claim 1, wherein the poly(alkylene carbonate) is poly(ethylene carbonate), poly(propylene carbonate) or poly(cyclohexene carbonate).

6. The process of claim 2, wherein the aqueous acid comprises an organic carboxylic acid, organic anhydride or organic carboxylic acid salt.

7. The process of claim 2, wherein the aqueous acid comprises a polyfunctional acid.

8. The process of claim 2, wherein the aqueous acid comprises maleic acid, formic acid, acetic acid, lactic acid, maleic anhydride, citric acid, glutaric acid, acrylic acid, methacrylic acid, pyromellitic dianhydride, trimellitic anhydride, poly acrylic acid, poly methacrylic acid, poly(acrylic acid-co-maleic acid), poly(acrylic acid-co-ethylene), poly(acrylic acid-co styrene), poly(methacrylic acid-co-maleic acid), poly (methacrylic acid-co ethylene), or poly(methacrylic acid-co styrene).

9. The process of claim 2, wherein the poly(alkylene carbonate) before being added in step (i) has a metal ion content of 0.5 to 100,000 wtppm.

10. A poly(alkylene carbonate) obtained by the process of claim 2 and comprising at least 0.001 wt % of metal ions.

11. A poly(alkylene carbonate) obtained by the process of claim 2 having an onset of thermal decomposition, as measured by thermogravametric analysis in $N_2$ at 2° C./min or faster, which is higher than the same poly(alkylene carbonate) obtained by a process of claim 2 in the absence of said acid.

12. An article comprising a poly(alkylene carbonate) as claimed in claim 10 wherein the article is a molded article, film, or circuit board.

13. The process of claim 1, wherein the poly(alkylene carbonate) before being added in step (i) has a metal ion content of 0.5 to 100,000 wtppm.

14. A poly(alkylene carbonate) obtained by the process of claim 1 and comprising at least 0.001 wt % of metal ions.

15. The process of claim 2, wherein the poly(alkylene carbonate) is a copolymer of carbon dioxide and one or more of propylene oxide, ethylene oxide or cyclohexene oxide.

16. The process of claim 2, wherein the poly(alkylene carbonate) is poly(ethylene carbonate), poly(propylene carbonate) or poly(cyclohexene carbonate).

17. The process of claim 3, wherein the poly(alkylene carbonate) is a copolymer of carbon dioxide and one or more of propylene oxide, ethylene oxide or cyclohexene oxide.

18. The process of claim 3, wherein the poly(alkylene carbonate) is poly(ethylene carbonate), poly(propylene carbonate) or poly(cyclohexene carbonate).

19. The process of claim 3, wherein the catalyst comprises manganese, magnesium, cobalt, or zinc.

* * * * *